US012711186B2

(12) United States Patent
Li et al.

(10) Patent No.: US 12,711,186 B2
(45) Date of Patent: Aug. 18, 2026

(54) GENERATING STRUCTURED REPRESENTATIONS OF AGGREGATED CYBERSECURITY ISSUES

(71) Applicant: Palo Alto Networks, Inc., Santa Clara, CA (US)

(72) Inventors: Lin Li, Sunnyvale, CA (US); Zhibin Zhang, Santa Clara, CA (US); Yu Fu, Sunnyvale, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 114 days.

(21) Appl. No.: 18/776,629

(22) Filed: Jul. 18, 2024

(65) Prior Publication Data

US 2026/0023793 A1 Jan. 22, 2026

(51) Int. Cl.

| | |
|---|---|
| ***G06F 16/23*** | (2019.01) |
| ***G06F 16/3331*** | (2025.01) |
| ***G06F 16/951*** | (2019.01) |
| ***G06F 40/20*** | (2020.01) |

(52) U.S. Cl.

CPC ........ *G06F 16/951* (2019.01); *G06F 16/2379* (2019.01); *G06F 16/3331* (2019.01); *G06F 40/20* (2020.01)

(58) Field of Classification Search

CPC ............... G06F 16/951; G06F 16/2379; G06F 16/3331; G06F 40/20

See application file for complete search history.

(56) References Cited

U.S. PATENT DOCUMENTS

| | | | | |
|---|---|---|---|---|
| 2006/0253213 | A1* | 11/2006 | Ocke | G06Q 10/06 700/97 |
| 2016/0019192 | A1* | 1/2016 | Crapo | G06F 40/30 715/234 |
| 2017/0109697 | A1* | 4/2017 | Panemangalore | G06F 16/245 |
| 2018/0219919 | A1* | 8/2018 | Crabtree | G06F 16/2477 |
| 2019/0379796 | A1* | 12/2019 | Sugita | H04N 1/00225 |
| 2021/0056268 | A1* | 2/2021 | Platek | G06F 5/00 |
| 2021/0168175 | A1* | 6/2021 | Crabtree | G06F 16/951 |
| 2025/0252095 | A1* | 8/2025 | Lichtenstein | G06F 16/2428 |
| 2026/0012490 | A1* | 1/2026 | Hu | H04L 63/205 |

* cited by examiner

*Primary Examiner* — Jorge A Casanova
(74) *Attorney, Agent, or Firm* — Gilliam IP PLLC

(57) ABSTRACT

A cybersecurity intelligence system maintains a current view of published cybersecurity issues by periodically crawling websites that publish information about cybersecurity issues, including first impression issues and updates to issues. The system aggregates unstructured descriptions for a same issue. For each published issue detected from crawling, the system prompts a foundation model to generate a structured representation that can be consumed. The structured representation includes key-value pairs corresponding to issue type and affected vendor product. Distilling and consolidating the issue descriptions into these informational components intelligently surfaces salient features of the information for addressing issues. After some quality assurance of the structured representations from the model, the structured representations are published for access by consumers.

20 Claims, 4 Drawing Sheets

GENERATING STRUCTURED REPRESENTATIONS OF AGGREGATED CYBERSECURITY ISSUES

BACKGROUND

The disclosure generally relates to data processing (e.g., CPC subclass G06F) and to computing arrangements based on specific computational models (e.g., CPC subclass G06N).

Rapid developments in artificial intelligence (AI) technologies have spawned numerous terms with fluid meanings. Recently, AI technologies are frequently referred to with the terms large language model (LLM), generative AI, and foundation model. Many of these technologies are based on or relate to the "Transformer" architecture.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks. There has been subsequent research in similar Transformer-based sequence modeling. The architecture of a Transformer model typically is a neural network with transformer blocks/layers, which include self-attention layers, feed-forward layers, and normalization layers. The Transformer model learns context and meaning by tracking relationships in sequential data.

Some LLMs are based on the Transformer architecture. An LLM is "large" because the training parameters are typically in the billions and have been approaching a trillion parameters. AI technologies are not limited to LLMs and research and utilization of "lightweight" language models (i.e., fewer parameters than large) has grown. Language models can be pre-trained to perform general-purpose tasks or tailored to perform specific tasks. Tailoring of language models can be achieved through various techniques, such as prompt engineering and fine-tuning. In addition, zero-shot prompting and few-shot prompting can provide context or context and examples to guide a LLM.

The first instances of generative models can be found in research of the 1960s and 1970s which used generative models and statistical models to generate new instances of data. Advancements in neural networks and deep learning increased the capabilities of generative AI. The introduction of generative adversarial networks (GAN), considered a foundation model, created media that was arguably original. The introduction and advancements of the Transformer architecture yielded the Generative Pre-Trained Transformer (GPT) often associated with current generative AI technology.

BRIEF DESCRIPTION OF THE DRAWINGS

Embodiments of the disclosure may be better understood by referencing the accompanying drawings.

DESCRIPTION

Figure 1:
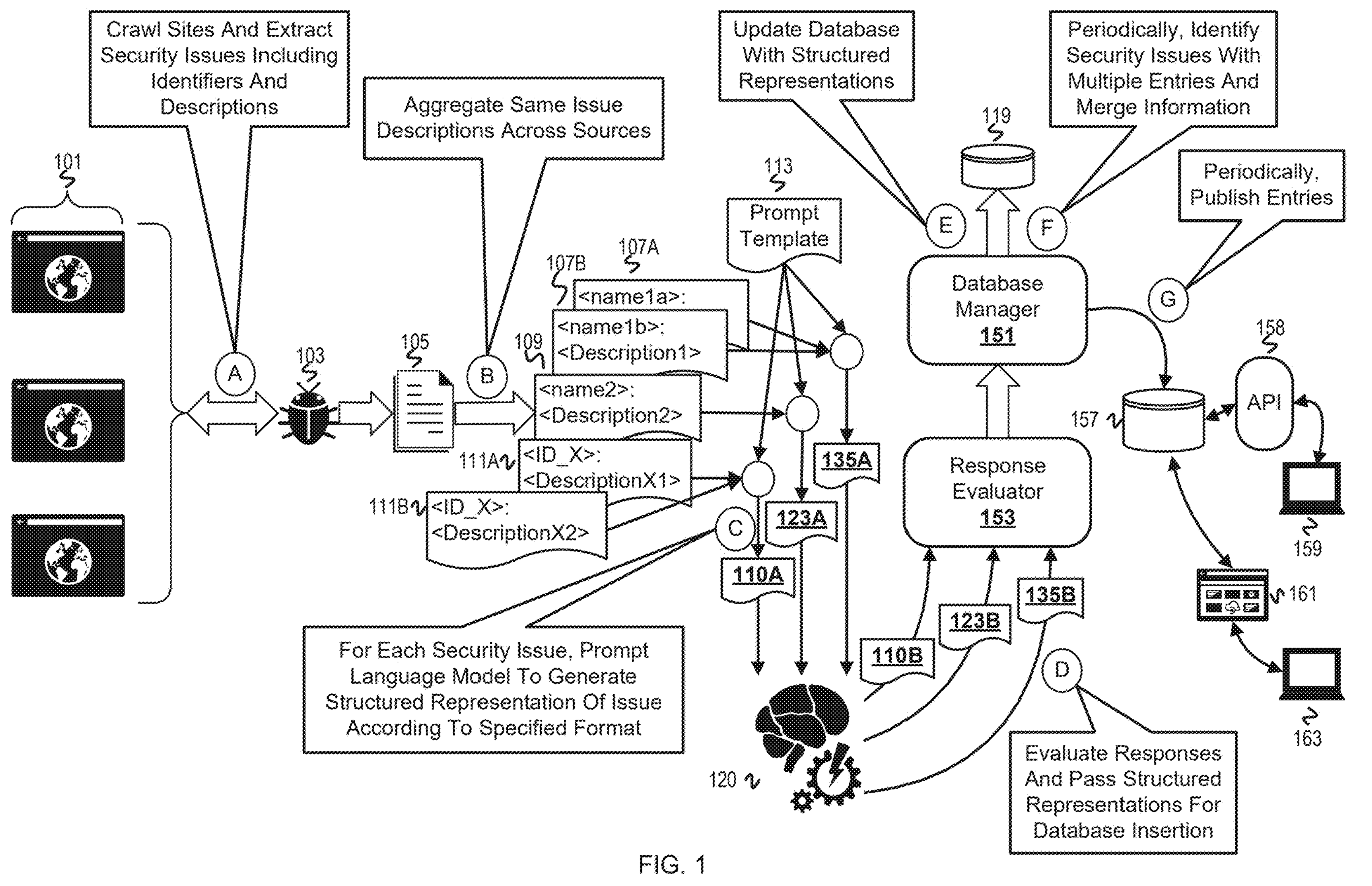
FIG. 1 depicts a cybersecurity intelligence system that collects and structures information about cybersecurity issues to provide an up-to-date, structured information source for consumers of cybersecurity information.

The description that follows includes example systems, methods, techniques, and program flows to aid in understanding the disclosure and not to limit claim scope. Well-known instruction instances, protocols, structures, and techniques have not been shown in detail for conciseness.

Terminology

A "cybersecurity issue" refers to any topic of concern or issue that relates to cybersecurity. Often, published information about a cybersecurity issue is information published about a vulnerability. However, a cybersecurity issue may be a threat, exploit, or proof of concept exploit.

A "prompt" refers to input to a foundation model and "prompting" refers to the act of submitting a prompt to a model to perform inference based on the submitted prompt. A prompt at least includes a natural language task instruction to the model. A prompt can also include context, constraints, and examples. In other words, a prompt is a natural language task instruction and other information that can assist the model in performing the task successfully. A prompt can have more than one task instruction and prompts can be chained to incorporate responses from the model into a subsequent prompt. A prompt can be entered by a user and/or constructed from a prompt template.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Increasing cybersecurity threats/issues are accompanied by increasing publications of descriptions of the issues to allow investigation to address the issues. The race between exploitations and solutions can also lead to incremental publishing of information as discovered. For instance, vendors and/or products susceptible to an issue may be added to published issue descriptions as discovered, as well as additional information about the issue. Although intended to facilitate quick response to issues, this ongoing, incremental publication has become a continuously growing flood of information that overwhelms researchers and security experts.

A system has been created that leverages artificial intelligence to structure the flood of information into a consistent format and efficiently update the structured information while preserving the format to facilitate consumption of the up-to-date structured information by various programmatic consumers (e.g., dashboards, application programming interfaces (APIs), etc.). The system maintains a current view of published cybersecurity issues by periodically crawling websites that publish information about cybersecurity issues, including first impression issues and updates to issues. While the websites may impose some structure on the published information, the descriptions of issues are unstructured. As different websites can provide slightly different descriptions of an issue, the system aggregates unstructured descriptions for a same issue. For each published issue detected from crawling, the system prompts a foundation model, such as a LLM, to generate a structured representation that can be consumed. The structured representation includes key-value pairs corresponding to issue type and affected vendor product. Distilling and consolidating the issue descriptions into these informational components intelligently surfaces salient features of the information for addressing issues. After some quality assurance of the structured representations from the LLM, the structured representations are published for access by consumers.

Example Illustrations

FIG. 1 depicts a cybersecurity intelligence system that collects and structures information about cybersecurity issues to provide an up-to-date, structured information source for consumers of cybersecurity information. The system uses a crawler 103 and a language model 120. The system uses a prompt template 113 to construct prompts to submit to the language model 120. The system also includes a response evaluator 153, a database 119, and a database manager 151. The response evaluator 153 ensures that responses from the language model 120 include valid structural representations of cybersecurity issues that can be stored in the database 119, which is used as a staging database to accumulate structured representations before publishing to a database accessible by consumers. The database manager 151 maintains the database 119. The system publishes structured representations of cybersecurity issues from the database 119 to a database 157 that is accessible by consuming entities 159, 163. Durations between publish actions from the database 119 to the database 157 are longer than updates to the database 119 to allow for consolidation of information.

FIG. 1 is annotated with a series of letters A-G for stages that each represents one or more operations. Although these stages are ordered for this example, the stages illustrate one example to aid in understanding this disclosure and should not be used to limit the claims. Subject matter falling within the scope of the claims can vary from what is illustrated.

At stage A, the crawler 103 crawls websites 101 to extract information about cybersecurity issues published on the websites 101. The websites 101 are myriad sources for the information about cybersecurity issues. Examples include websites of government organizations (e.g., the national vulnerabilities database (NVD)), websites of non-governmental organizations (e.g., the Common Vulnerabilities and Exposures (CVE) website), and websites of private entities (e.g., the Packet Storm website and the Metasploit® project). These websites can be presented as databases or services that publish information about cybersecurity issues. The crawler 103 will detect new documents or entries corresponding to a new issue or an update to an issue. A published cybersecurity issue may have some structure and include an identifier and a description. Even if the published information is considered structured, it will include an unstructured description of the issue. For example, the below vulnerability will be published on the NVD with the below identifier and unstructured description.

CVE Identifier: CVE-2014-6287

The findMacroMarker function in parserLib.pas in Rejetto HTTP File Server (aks HFS or HttpFileServer) 2.3x before 2.3c allows remote attackers to execute arbitrary programs via a % 00 sequence in a search action.

The same vulnerability will be published from the Metasploit website with the below name and unstructured description.

Name: Rejetto HTTP File Server (HFS) Unauthenticated Remote Code Execution

The Rejetto HTTP File Server (HFS) version 2.x is vulnerable to an unauthenticated server side template injection (SSTI) vulnerability. A remote unauthenticated attacker can execute code with the privileges of the user account running the HFS.exe server process. This exploit has been tested to work against version 2.4.0 RC7 and 2.3 m. The Rejetto HTTP File Server (HFS) version 2.x is no longer supported by the maintainers and no patch is available. Users are recommended to upgrade to newer supported versions.

The crawler 103 extracts information 105, which includes information collected for multiple cybersecurity issues from multiple sources during a crawling interval.

At stage B, the system aggregates descriptions of a same cybersecurity issue across sources. The system parses the information about cybersecurity issues collected by the crawler 103. For instance, the system can collate the published entries/documents collected from crawling and then determine which cybersecurity issues have multiple descriptions. These can be aggregated into a same string, for example.

At stage C, the system prompts the language model 120 for each cybersecurity issue. The system constructs a prompt for each cybersecurity issue identified in the information 105. Since the crawler 103 crawled multiple sources, a cybersecurity issue will likely have multiple descriptions. FIG. 1 illustrates three prompts 110A, 123A, 135A constructed for different cybersecurity issues. In FIG. 1, the system constructs the prompt 135A for a cybersecurity issue having descriptions 107A, 107B that would have been aggregated prior to prompt construction or aggregated as part of prompt construction. For instance, the prompt template 113 can define a string variable for an input description that will form part of a prompt. The system can write the descriptions of 107A, 107B into that string variable. FIG. 1 depicts that the descriptions 107A, 107B are associated with different names for a same cybersecurity issue. Again, this can occur due to the information being collected from different sources and different entities discovering different information when researching an issue. Likewise, the system constructs the prompt 123A with the prompt template 113 and description 109 and constructs the prompt 110A with the prompt template 113 and descriptions 111A, 111B. The system submits each of the prompts 110A, 123A, 135A to the language model 120, for example in a call defined by an API of a service or application that provides access to the language model 120. Accordingly, the language model 120 respectively generates responses 110B, 123B, 135B to the prompts 110A, 123A, 135A.

At stage D, the response evaluator 153 evaluates each of the responses 110B, 123B, 135B. The response evaluator 153 examines each response to determine whether it includes a valid structured representation of a cybersecurity issue. The system can define a format with required key-value pairs and optional or additional key-value pairs. The response evaluator 153 examines responses to determine whether the responses include structured representations with the required key-value pairs. The response evaluator 153 will pass those valid, structured representations to the database manager 151 or invoke the database manager 151 to update the database 119.

At stage E, the database manager 151 updates the database 119 with the valid, structured representations that pass the response evaluator 153. The database manager 151 updates the database 119 with entries for the structured representations. Depending upon the database implementation, the database manager 151 can index entries by identifier (e.g., CVE identifier, threat name, etc.) or by multiple identifiers.

At stage F, the database manager 151 periodically examines the database for issues having multiple entries. Since an issue may have different identifiers across different sources and/or updates to published information can affect identifiers, reconciliation/consolidation of multiple entries for a same issue may not occur until after multiple crawl jobs.

At stage G, the database manager 151 periodically publishes entries of the database 119 to a database 157. The database manager 151 can track database updates and only publish new and updated entries to the database 157, for example, with snapshotting or other incremental update techniques. FIG. 1 depicts an API 158 between the consumer 159 and the database 157 and a dashboard 161 presented to the consumer 163. The API 158 can be defined by the system for accessing the database 157 or an API of another application or service granted permission to access the database 157. Examples of the types of applications or services that can define APIs for accessing the structured representations include threat prevention (e.g., identify vulnerabilities by product), intrusion prevention (e.g., prioritize signature creation based on impact footprint in terms of products and/or vendor), threat intelligence, advanced threat prevention, and Internet of Things (IoT) security enhancements. The dashboard 161 can be a service that updates based on the contents of the database 157 and allows filtering and/or other interactions (e.g., filtering, expanding, drilling down, etc.) for data exploration by the consumer 163.

Figure 2:
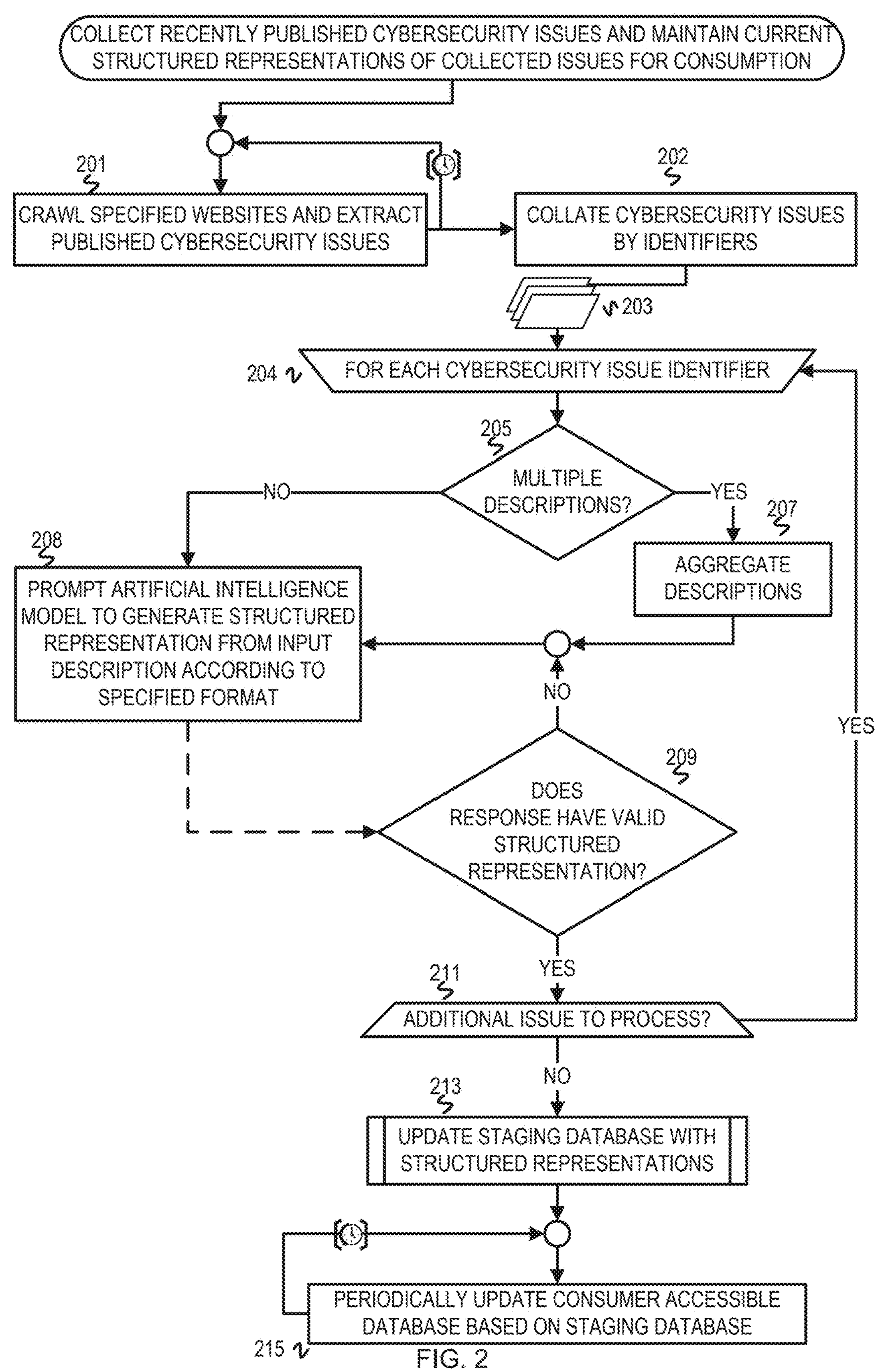
FIG. 2 is a flowchart of example operations for collecting recently published cybersecurity issues and maintaining current structured representations of collected issues for consumption.

FIG. 2 is a flowchart of example operations for collecting recently published cybersecurity issues and maintaining current structured representations of collected issues for consumption. Description of the example operations refer to an intelligence system as a shortened form for the cybersecurity intelligence system of FIG. 1. FIG. 2 includes depiction of a clock to represent an operation being performed according to a schedule. Since information is an amorphous term, the description uses "issue" to refer to information extracted from a webpage (i.e., copied) that includes an identification component and a description component. This is also sometimes referred to as an entry, but "entry" does not necessarily encompass the different publication techniques. Thus, entry is used for its simplicity and issue is used to avoid any imposed implication that the scope of the claims should be limited to a narrow interpretation of entry.

At block 201, the intelligence system crawls specified websites and extracts published cybersecurity issues. For instance, the intelligence system invokes a crawler according to a schedule to crawl a specified set of websites that publish information about cybersecurity issues. These sources of information can be the previously mentioned government or private company maintained websites that publish issues with identifiers (e.g., name, number, or title) and descriptions. However, the specified websites can also be university websites or private individual websites, assuming they have been specified for crawling because they are trusted sources of information. The myriad sources will have different formats for publishing information. While some websites will publish an entry or a page/document with a CVE identifier and a description, other websites may use a name and a description. Furthermore, a website might publish the information with a page title and description. Across the various formats, the published information for a cybersecurity issue will include an identifier (e.g., CVE ID, threat name, blog post title, etc.) and issue description. A line from block 201 returning to block 201 represents periodic crawling according to a schedule.

At block 202, the intelligence system collates cybersecurity issues by identifiers. Extracted issues from different sources can correspond to a same cybersecurity issue but have different descriptions and even different identifiers. The intelligence system can organize the extracted entries by identifiers and associate multiple extracted issues with that same identifier. In addition, the intelligence system can parse the extracted issues to determine whether descriptions use a same name and index the different extracted issues with the same name. The crawling, extracting, and collating yields extracted cybersecurity issues 203.

At block 204, the intelligence system begins processing each identifier of the extracted cybersecurity issues 203. Since at least some of the extracted issues will have been collated by a common identifier (e.g., CVE ID or threat name), processing each issue would be iterating over indices that may be associated with multiple extracted issues.

At block 205, the intelligence system determines whether the identifier is associated with multiple descriptions. The intelligence system can track issues in a structure that indexes by identifiers that each reference a description or, in the case of collated issues, reference multiple descriptions. Implementations can maintain a counter to use for determining whether an issue has multiple descriptions or determine whether there is more than one reference from the identifier being used as an index. If there are multiple descriptions for the issue, then operational flow proceeds to block 207. Otherwise, operational flow proceeds to block 208.

At block 207, the intelligence system aggregates the multiple descriptions. The descriptions and identifiers will be consolidated into a text string to be inserted into a prompt. Aggregation can be concatenating the multiple descriptions. Operational flow proceeds from block 207 to block 208.

At block 208, the intelligence system prompts an artificial intelligence model to generate a structured representation from an input description according to specified format. The intelligence system constructs a prompt from a prompt template and the issue description. The prompt template will have a placeholder or variable for writing in the description or aggregated description as the input description. The prompt template will also include one or more task instructions to cause an AI model, such as a LLM or other foundation model, to generate a structured representation of the issue corresponding to the input description according to a format defined in the prompt template. The prompt template specifies that the structured representation of the issue includes fields or keys for issue type and product(s) affected by the issue. A prompt template can also require that the structured representation include a field/key for vendor. The task instruction(s) in the prompt template directs an AI model to extract values for these fields. Since the AI model will have been trained for multiple natural language processing tasks including named entity recognition, the AI model is capable of extracting named entities, such as vendor and product names. The prompt template can also include a task instruction(s) directing an AI model to extract version information and how to disambiguate some aspects of the information provided to the AI model. As an example, a prompt template can be:

"You are an assistant cybersecurity researcher. Issue description text will be inserted at the end of this request. Extract names of entities according to the schema of the JSON object that I define for you. From the inserted text, extract source of the text, issue type, vendor, and product. If the text also indicates version information affected by the issue, then also extract the version.

For the type of issue, extract the type of issue from the text and then select the one in the list {issue type list} most similar to the issue type you extracted. For the vendor, if you extract more than one vendor, select the first vendor you extract for your answer. If you extract more than one product for the vendor that you select, create a list of the extracted products for your answer. For the source, create a list if you extract more than one source.

If you cannot extract information from the text for a key in the defined JSON object, then return an empty string.

Here is the format of the JSON object that you should return:

```
"vulnerability_type": [{
"source": [""],
"type": ""
}],
"affected_vendor_product": [{
"affected_vendor": "",
"affected_product": [""],
"source": [""],
"affected_vendor_cpe": "",
"affected_product_cpe": ""
}],
Issue Description: "<input description>" "
```

A dashed line depicted from block 208 to block 209 represents waiting for a response from the AI model.

At block 209, the intelligence system determines whether the response from the AI model includes a valid structured representation. The intelligence system ensures that the structured representation includes required fields or key-value pairs. Below are examples of input descriptions and valid structured representations generated therefrom.

| Input Description Inserted into Prompt Template | Response from Model |
|---|---|
| "issue description": "The Sticky Buttons WordPress plugin before 3.2.4 does not have CSRF checks in some bulk actions, which could allow attackers to make logged in admins perform unwanted actions, such as deleting buttons via CSRF attacks" | "vulnerability_type": [{<br>"source": ["nvd \| description"<br>],<br>"type": "Cross-Site Request Forgery"<br>}],<br>"affected_vendor_product": [{<br>"affected_vendor": "WordPress",<br>"affected_product": "Sticky Buttons Plugin",<br>"source": [<br>"nvd \| description"<br>],<br>"affected_vendor_cpe": "wordpress",<br>"affected_product_cpe":<br>"sticky_buttons_plugin"<br>}] |
| "issue description": ["packetstorm \| Windows PspBuildCreateProcessContext Double-Fetch / Buffer Overflow", "metasploit \| Microsoft CVE-2024-26218: Windows Kernel Elevation of Privilege Vulnerability"] | "vulnerability_type": [{<br>"source": ["packetstorm \| title"],<br>"type": "Buffer Overflow"<br>}]<br>"affected_vendor_product": [{<br>"affected_product": "Windows Kernel",<br>"affected_vendor_cpe": "microsoft",<br>"affected_vendor": "Microsoft",<br>"source": ["metasploit \| title"],<br>"affected_product_cpe":<br>"windows kernel"<br>},<br>{<br>"affected_vendor": "Microsoft",<br>"affected_product": "Windows",<br>"source": ["packetstorm \| title"],<br>"affected_vendor_cpe": "microsoft",<br>"affected_product_cpe": "windows"<br>}] |

If a response does not include a valid, structured description, then operational flow returns to block 208. A retry limit can be set for repeating prompts. If the retry limit is reached, then operational flow would continue since the input description lacks some information that could be gained in a subsequent crawl. If the response includes a valid, structured representation, then operational flow proceeds to block 211.

At block 211, the intelligence system determines whether there is another cybersecurity issue to process. If there is another issue to process, then operational flow returns to block 204. Otherwise, operational flow proceeds to block 213.

At block 213, the intelligence system updates a staging database with the valid, structured representations. After accumulating the structured representations from prompting the AI model, the structured representations are inserted into a database. This is referred to as a staging database since structured representations are staged here before being published for consumption. This staging allows for increased quality of fidelity of information and consolidation from subsequent crawls in the case of updates being published. Configuration of staging time (i.e., time before publishing to the consumer accessible database) will vary depending upon a chosen tradeoff between succinctness of information and time to publish in light of time-to-exploitation. In some cases, the system does not stage and instead will publish and maintain the consumer accessible database without staging.

At block 215, the intelligence system periodically updates the consumer accessible database based on staging database. As previously mentioned, deltas can be published to the consumer accessible database based on snapshots, for example. A line with a clock from block 215 that returns to block 215 represents the periodic scheduling.

Figure 3:
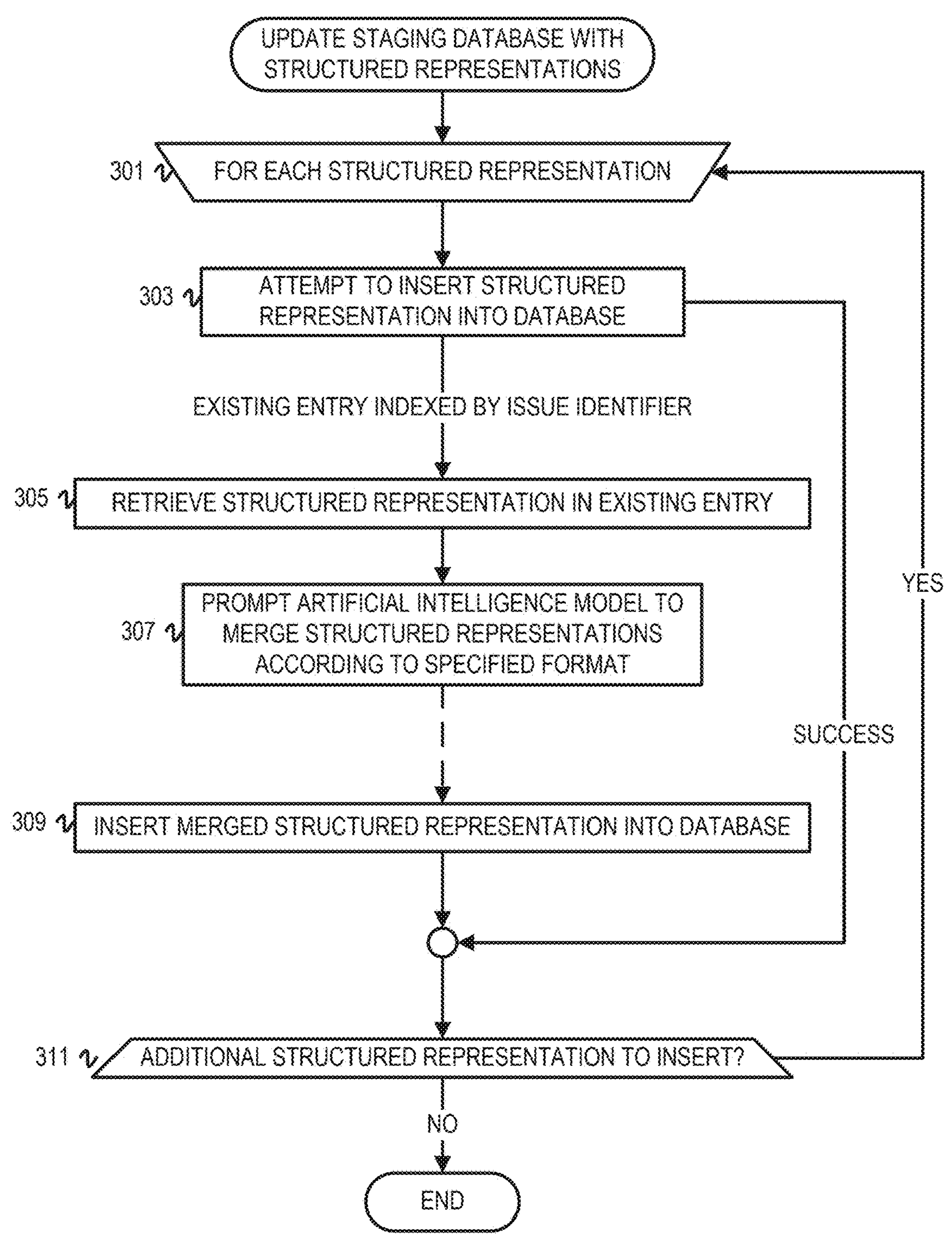
FIG. 3 is a flowchart of operations for updating the staging database with structured representations.

FIG. 3 is a flowchart of operations for updating the staging database with structured representations. The example operations of FIG. 3 presume the possibility of a cybersecurity issue already being represented in the staging database. A research or an investigation update to a vulnerability may be published after weeks of research and fall outside of the crawling and prompting intervals (i.e., an update may occur after structured representations have been inserted into the database). For these cases, the AI model is leveraged to intelligently merge/consolidate information.

At block 301, the intelligence system begins processing the structured representations that have been obtained from the AI model in response to the prompting. This presumes that the structured representations are accumulated and then the batch of structured representations are inserted into the database. Implementations can instead attempt to insert each structured representation when obtained from the AI model.

At block 303, the intelligence system attempts to insert the structured representation into the database. The intelligence system executes a function to insert the structured representation or makes an API call to insert the structured representation. The structured representation will be identified by an identifier. If the database already has an entry indexed by that identifier, then operational flow proceeds to block 305. Otherwise, the insertion is successful and operational flow proceeds to block 311. There are other cases of failed insertion, such as a database being offline or request timeout, but those are not relevant to the subject matter of this disclosure.

At block 305, the intelligence system retrieves the structured representation in the existing entry that has a same identifier as the structured representation that was to be inserted. The entry will have an identifier and key-value pairs at least for issue type, affected vendor, and affected product.

At block 307, the intelligence system prompts the AI model to merge the structured representations according to the specified format. The intelligence system can use the same prompt template and insert the structured descriptions as the input description. Alternatively, the intelligence system can use another prompt template that has been written for the specific task of merging structured representations for a same issue. The prompt template can include a task instruction to merge structured descriptions and include placeholders or variables for insertion of the structured descriptions to merge. The task instruction(s) can also direct the model to maintain separate instances for different vendors. A dashed line from block 307 to block 309 represents waiting for an answer from the AI model.

At block 309, the intelligence system inserts the merged structured representation into the database. Again, the intelligence system makes an API call or executes a function to insert the merged structured representation that has been returned from the AI model. Although not depicted, evaluation of the merged structured representation can be performed to ensure the merged structured representation is valid.

At block 311, the intelligence system determines whether there is another structured representation from the AI model to insert into the database. If so, then operational flow returns to block 301. Otherwise, the flow of FIG. 3 ends.

The example operations are described with reference to a cybersecurity intelligence system for consistency among the figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
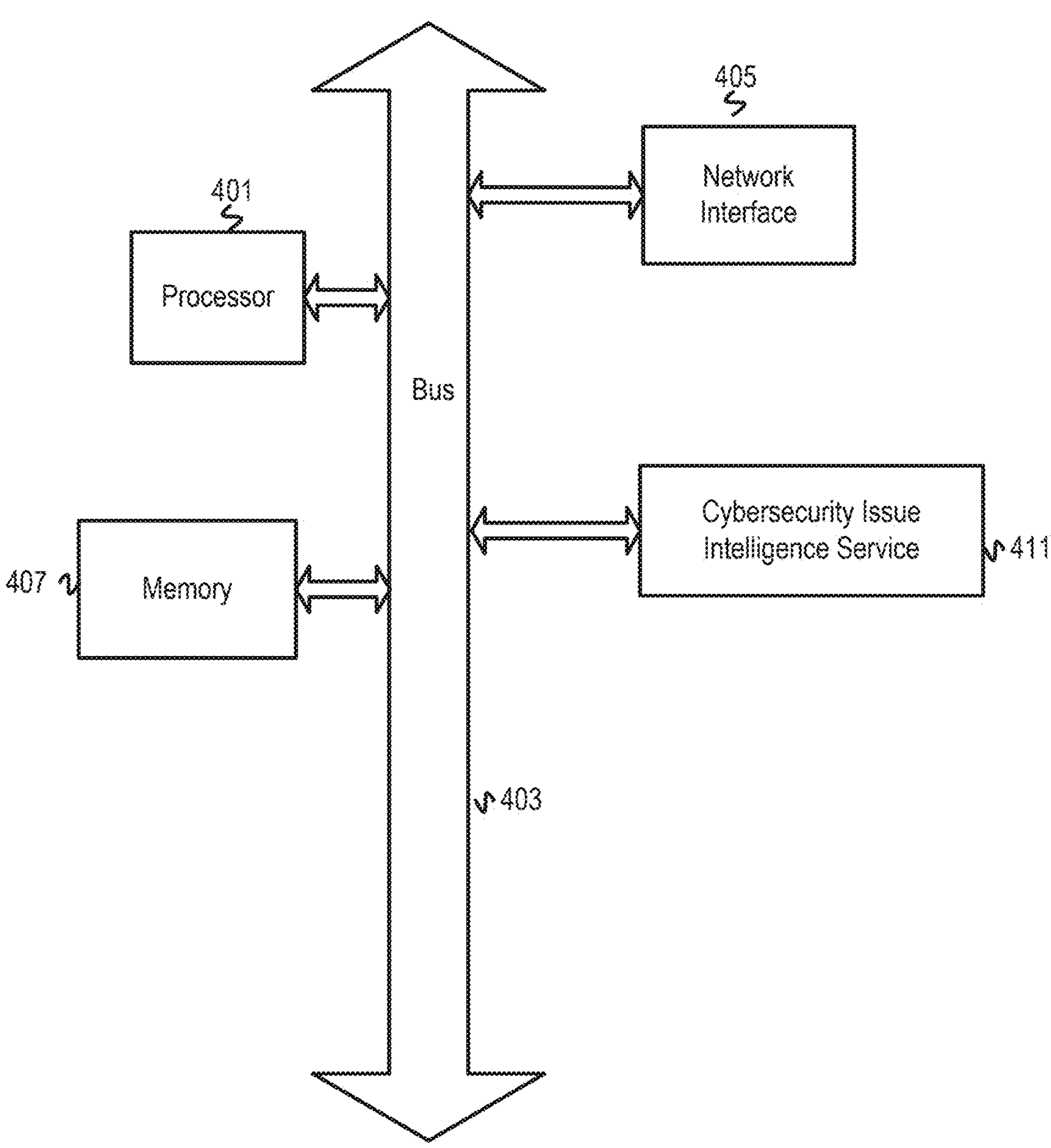
FIG. 4 depicts an example computer system with a cybersecurity issue intelligence service.

FIG. 4 depicts an example computer system with a cybersecurity issue intelligence service. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a cybersecurity issue intelligence service 411. The cybersecurity issue intelligence service 411 is an ongoing service that crawls cybersecurity websites that publish discovered vulnerabilities, threats, exploits, etc., and updates to those cybersecurity issues. With vulnerabilities alone being discovered at an average of 50 per day in 2021 and a trend of this rate increasing, processing this information by a human is not feasible. The impossibility of performing this task by a human becomes more apparent when considering that several websites may publish slightly different information and make different discoveries for each issue. Therefore, the cybersecurity issue intelligence service 411 uses a crawler or crawling service to continuously collect information by scheduling crawl jobs on specified websites trusted to publish information about cybersecurity issues. Between crawl jobs, the cybersecurity issue intelligence service 411 prompts a foundation model to create an object that indicates salient features of the issue, such as issue type, affected vendor, and affected product. This object or structured representation recasts unstructured information extracted from the websites into a consistent format that can be consumed by a myriad of consumers (e.g., dashboards, APIs, analytics services, etc.) that prioritize visibility of the salient features for research, analysis, and responding to threats. The cybersecurity issue intelligence service 411 publishes the objects for access by these consumers. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:

periodically collecting information of cybersecurity issues from multiple websites that publish information about cybersecurity issues, wherein the collected information comprises unstructured descriptions;

for each cybersecurity issue, prompting a language model to generate a structured representation indicating issue type and affected vendor product based on the unstructured description;

updating a first database with structured representations generated by the language model; and publishing structured descriptions in the first database to a second database for programmatic consumption.

2. The method of claim 1, wherein periodically collecting unstructured descriptions comprises crawling the multiple websites for at least one of published entries not yet crawled and changed entries.

3. The method of claim 1 further comprising:

determining that a first cybersecurity issue has multiple descriptions in the collected information; and aggregating the multiple descriptions wherein prompting the language model for the first cybersecurity issue comprises constructing a prompt with the aggregated descriptions and a prompt template that includes task instructions to extract an issue type, a vendor, and a product from the aggregated descriptions.

4. The method of claim 1, wherein prompting a language model to generate a structured representation for each cybersecurity issue comprises constructing a prompt with the collected information of the cybersecurity issue and a prompt template that includes a first task instruction to select, based on the unstructured description of the cybersecurity issue, an issue type from a list of issue types specified in the prompt template and to generate the structured representation with the selected issue type.

5. The method of claim 4, wherein the prompt template includes a second task instruction to extract an issue type from the unstructured description, wherein the first task instruction to select an issue type from the list of issue types comprises an indication that selection of the issue type is based on the issue type extracted from the unstructured description.

6. The method of claim 1, wherein prompting a language model to generate a structured representation that indicates affected vendor product for each cybersecurity issue comprises constructing a prompt with the unstructured description of the cybersecurity issue and a prompt template that includes a first task instruction to extract a vendor and product from the unstructured description and to generate the structured representation with the extracted vendor and product.

7. The method of claim 6, wherein the first instruction also instructs the language model to extract additional information including a name or title of an issue, a common platform enumerator (CPE) if available, and affected version information and to generate the structured representation with the extracted additional information.

8. The method of claim 6, wherein the first task instruction indicates how to select one vendor if multiple vendors are extracted from the unstructured description and to create a list of products to include in the structured description of affected vendor product if more than one product is extracted from the unstructured description and corresponds to the selected vendor.

9. The method of claim 1, wherein prompting a language model to generate a structured representation comprises, for each cybersecurity issue, constructing a prompt with the unstructured description of the cybersecurity issue and a prompt template that includes multiple example structured representations of cybersecurity issues.

10. The method of claim 1, further comprising identifying multiple entries corresponding to a same cybersecurity issue and prompting the language model to merge the structured representations for the cybersecurity issue into a single structured representation.

11. The method of claim 1, wherein a cybersecurity issue can be any one of a vulnerability, an exploit, and a proof of concept exploit.

12. A non-transitory, machine-readable medium having program code stored thereon, the program code comprising instructions to:

periodically crawl websites that publish information about cybersecurity issues and extract unstructured descriptions of cybersecurity issues from the websites, wherein each cybersecurity issue has one or more unstructured descriptions;

for each cybersecurity issue, prompt a language model to generate a structured representation that indicates issue type and affected vendor product based on the one or more unstructured descriptions of the cybersecurity issue according to a format specified in the prompt template;

update a first database with structured representations generated by the language model for the cybersecurity issues; and publish structured representations in the first database to a second database for programmatic consumption.

13. The non-transitory, machine-readable medium of claim 12, wherein the program code further comprises instructions to:

determine which cybersecurity issues have multiple unstructured descriptions; and for each cybersecurity issue having multiple unstructured descriptions, aggregate the multiple unstructured descriptions;

wherein the instructions to prompt the language model comprise instructions to construct a prompt, for each cybersecurity issue with aggregated descriptions, with the aggregated descriptions and a prompt template that includes task instructions to extract an issue type, a vendor, and a product from the aggregated descriptions.

14. The non-transitory, machine-readable medium of claim 12, wherein the instructions to prompt a language model to generate a structured representation that indicates issue type comprise, for each cybersecurity issue, instructions to construct a prompt with the one or more unstructured descriptions of the cybersecurity issue and a prompt template that includes a first task instruction to select, based on the one or more unstructured descriptions, an issue type from a list of issue types specified in the prompt template and generate the structured representation with the selected issue type.

15. The non-transitory, machine-readable medium of claim 12, wherein the instructions to prompt a language model to generate a structured representation that indicates affected vendor product for each cybersecurity issue comprise instructions to construct a prompt with the one or more unstructured descriptions of the cybersecurity issue and a prompt template that includes a first task instruction to extract a vendor and product from the one or more unstructured descriptions and to generate the structured representation with the extracted vendor and product.

16. The non-transitory, machine-readable medium of claim 15, wherein the first task instruction also instructs the language model to extract additional information including a name or title of an issue, a common platform enumerator (CPE) if available, and affected version information and to generate the structured representation with the extracted additional information.

17. An apparatus comprising:

a processor; and a machine-readable medium having stored thereon instructions executable by the processor to cause the apparatus to, periodically crawl websites that publish information about cybersecurity issues and extract unstructured descriptions of cybersecurity issues from the websites, wherein each cybersecurity issue has one or more unstructured descriptions;

for each cybersecurity issue, prompt a language model to generate a structured representation that indicates issue type and affected vendor product based on the one or more unstructured descriptions of the cybersecurity issue according to a format specified in the prompt template;

update a first database with structured representations generated by the language model for the cybersecurity issues; and publish structured representations in the first database to a second database for programmatic consumption.

18. The apparatus of claim 17, wherein the machine-readable medium further has stored thereon instructions executable by the processor to cause the apparatus to:

determine which cybersecurity issues have multiple unstructured descriptions; and for each cybersecurity issue having multiple unstructured descriptions, aggregate the multiple unstructured descriptions;

wherein the instructions to prompt the language model comprise instructions to construct a prompt, for each cybersecurity issue with aggregated descriptions, with the aggregated descriptions and a prompt template that includes task instructions to extract an issue type, a vendor, and a product from the aggregated descriptions.

19. The apparatus of claim 17, wherein the instructions to prompt a language model to generate a structured representation that indicates issue type comprise instructions executable by the processor to cause the apparatus to, for each cybersecurity issue, construct a prompt with the one or more unstructured descriptions of the cybersecurity issue and a prompt template that includes a first task instruction for a language model to select, based on the one or more unstructured descriptions, an issue type from a list of issue types specified in the prompt template and for the language model to generate the structured representation with the selected issue type.

20. The apparatus of claim 17, wherein the instructions comprise instructions executable by the processor to cause the apparatus to prompt a language model to generate a structured representation that indicates affected vendor product for each cybersecurity issue comprise instructions executable by the processor to cause the apparatus to construct a prompt with the one or more unstructured descriptions of the cybersecurity issue and a prompt template that includes a first task instruction for a language model to extract a vendor and product from the one or more unstructured descriptions and for a language model to generate the structured representation with the extracted vendor and product.

* * * * *